United States Patent
Paulino et al.

(10) Patent No.: US 11,913,343 B2
(45) Date of Patent: Feb. 27, 2024

(54) REPLACEABLE ROTOR BLADE TIP CLEARANCE MEASUREMENT DEVICE FOR A GAS TURBINE ENGINE

(71) Applicant: United Technologies Corporation, Farmington, CT (US)

(72) Inventors: Jose R. Paulino, Saco, ME (US); Veronika Reynolds, Lawrence, MA (US); Jason David Liles, Port Saint Lucie, FL (US)

(73) Assignee: RTX Corporation, Farmington, CT (US)

( * ) Notice: Subject to any disclaimer, the term of this patent is extended or adjusted under 35 U.S.C. 154(b) by 316 days.

(21) Appl. No.: 16/592,001

(22) Filed: Oct. 3, 2019

(65) Prior Publication Data
US 2021/0102474 A1    Apr. 8, 2021

(51) Int. Cl.
*F01D 21/00* (2006.01)
*F01D 11/12* (2006.01)
*B33Y 80/00* (2015.01)

(52) U.S. Cl.
CPC .......... *F01D 21/003* (2013.01); *F01D 11/122* (2013.01); *B33Y 80/00* (2014.12); *F05D 2230/80* (2013.01); *F05D 2240/55* (2013.01); *F05D 2250/141* (2013.01); *F05D 2250/15* (2013.01); *F05D 2250/283* (2013.01); *F05D 2270/821* (2013.01)

(58) Field of Classification Search
CPC ...... F01D 11/122; F01D 21/003; B33Y 80/00
See application file for complete search history.

(56) References Cited

U.S. PATENT DOCUMENTS

| | | | |
|---|---|---|---|
| 3,932,941 A | 1/1976 | Ormsby | |
| 4,804,905 A * | 2/1989 | Ding | F01D 21/04 174/152 GM |
| 5,649,369 A | 7/1997 | Thoren | |
| 8,622,016 B2 | 1/2014 | Wiebe | |
| 8,864,446 B2 | 10/2014 | Singh et al. | |
| 9,709,376 B2 * | 7/2017 | Zhe | F01D 11/14 |
| 2001/0032497 A1 * | 10/2001 | Schroeder | B60R 11/00 73/114.26 |
| 2004/0126225 A1 * | 7/2004 | Ghasripoor | F16J 15/3288 415/173.3 |
| 2009/0148278 A1 * | 6/2009 | Allen | F01D 11/125 415/173.4 |
| 2010/0242293 A1 * | 9/2010 | Willett | G01B 7/14 33/501 |

(Continued)

FOREIGN PATENT DOCUMENTS

| | | |
|---|---|---|
| EP | 2698502 A1 | 2/2014 |
| GB | 2297162 A | 7/1996 |

OTHER PUBLICATIONS

EP Search Report dated Jan. 25, 2021 issued for related European Patent Application No. 20188999.5.

*Primary Examiner* — Woody A Lee, Jr.
*Assistant Examiner* — Cameron A Corday
(74) *Attorney, Agent, or Firm* — Bachman & LaPointe, P.C.

(57) ABSTRACT

A replaceable rotor blade tip clearance measurement device for a gas turbine engine, includes a threaded section along an axis and an integral abradable tip with an internal lattice geometry that extends from the threaded section along the axis.

20 Claims, 4 Drawing Sheets

(56) References Cited

U.S. PATENT DOCUMENTS

| | | | |
|---|---|---|---|
| 2013/0209240 A1* | 8/2013 | McCaffrey | F01D 11/20 415/173.2 |
| 2017/0343334 A1 | 11/2017 | Whitlock et al. | |
| 2018/0224265 A1 | 8/2018 | Kuhman et al. | |

* cited by examiner

REPLACEABLE ROTOR BLADE TIP CLEARANCE MEASUREMENT DEVICE FOR A GAS TURBINE ENGINE

U.S. GOVERNMENT RIGHTS

This invention was made with Government support under contract W911W6-16-2-0012 awarded by the United States Army. The Government has certain rights in the invention.

BACKGROUND

The present disclosure relates generally to a gas turbine engine, and more particularly to replaceable rotor blade tip clearance measurement device that can be accessed without engine disassembly.

An engine static structure may include one or more blade outer air seals (BOAS) that provide an outer radial flow path boundary for the hot combustion gases. The BOAS surround respective rotor assemblies that rotate and extract energy from the hot combustion gases. The BOAS may be subjected to relatively intense temperatures during gas turbine engine operation.

In order to increase efficiency, a tip clearance between blade tips of the rotor assembly and an outer radial flow path boundary defined by the BOAS is relatively small. The abradable BOAS further reduces the tip clearance as the blade tips are designed to, at times, rub against the BOAS. Leakage at the tip clearance is a ratio between the gap between the outer radial flow path boundary and the overall size of the flow path such that the smaller the engine, the larger the percentage that the tip clearance is relative to the total flow. Relatively small engines are thus much more sensitive to tip clearance than larger engines.

Measurements of the tip clearance facilitates evaluation of cycle efficiencies and engine performance. Current methods of measuring running blade tip clearance involves removing the BOAS from the engine to inspect the rub on the abradable. Other methods make use of a rub button attached to the BOAS, but also require BOAS disassembly from the engine to measure rub interaction and calculate running tip clearance.

SUMMARY

A replaceable rotor blade tip clearance measurement device for a gas turbine engine according to one disclosed non-limiting embodiment of the present disclosure includes a threaded section along an axis and an integral abradable tip with an internal lattice geometry that extends from the threaded section along the axis.

A further embodiment of any of the foregoing embodiments of the present disclosure includes a bolt head adjacent to the threaded section.

A further embodiment of any of the foregoing embodiments of the present disclosure includes that the integral abradable tip is 0.25 inches in diameter.

A further embodiment of any of the foregoing embodiments of the present disclosure includes that the integral abradable tip is of a smaller diameter than the threaded section.

A further embodiment of any of the foregoing embodiments of the present disclosure includes that the internal lattice geometry is of a honeycomb pattern.

A further embodiment of any of the foregoing embodiments of the present disclosure includes that the internal lattice geometry is of a spiral pattern.

A further embodiment of any of the foregoing embodiments of the present disclosure includes that the internal lattice geometry is of a multiple circle pattern.

A further embodiment of any of the foregoing embodiments of the present disclosure includes that the internal lattice geometry is abradeable equivalent to an abradeable surface of a blade outer air seal.

A further embodiment of any of the foregoing embodiments of the present disclosure includes that the internal lattice geometry is additively manufactured.

A gas turbine engine according to one disclosed non-limiting embodiment of the present disclosure includes a replaceable rotor blade tip clearance measurement device accessible from outside the engine case, the replaceable rotor blade tip clearance measurement device comprising an integral abradable tip with an internal lattice geometry.

A further embodiment of any of the foregoing embodiments of the present disclosure includes a threaded section that extends from the integral abradable tip along an axis.

A further embodiment of any of the foregoing embodiments of the present disclosure includes that the integral abradable tip is of a smaller diameter than the threaded section.

A further embodiment of any of the foregoing embodiments of the present disclosure includes that the internal lattice geometry is one of a honeycomb pattern, a spiral pattern, and a multiple circle pattern.

A further embodiment of any of the foregoing embodiments of the present disclosure includes that the internal lattice geometry is shaped to define a predefined porosity with respect to a blade.

A further embodiment of any of the foregoing embodiments of the present disclosure includes that replaceable rotor blade tip clearance measurement device is additively manufactured.

A further embodiment of any of the foregoing embodiments of the present disclosure includes a multiple of replaceable rotor blade tip clearance measurement devices disposed circumferentially about the engine case.

A further embodiment of any of the foregoing embodiments of the present disclosure includes that the internal lattice geometry is additively manufactured.

A further embodiment of any of the foregoing embodiments of the present disclosure includes a bolt head that extends from the threaded section along the axis.

A further embodiment of any of the foregoing embodiments of the present disclosure includes that the integral abradable tip extends through a blade outer air seal.

A further embodiment of any of the foregoing embodiments of the present disclosure includes that the integral abradable tip provides a porosity equivalent to a blade outer air seal abradable.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
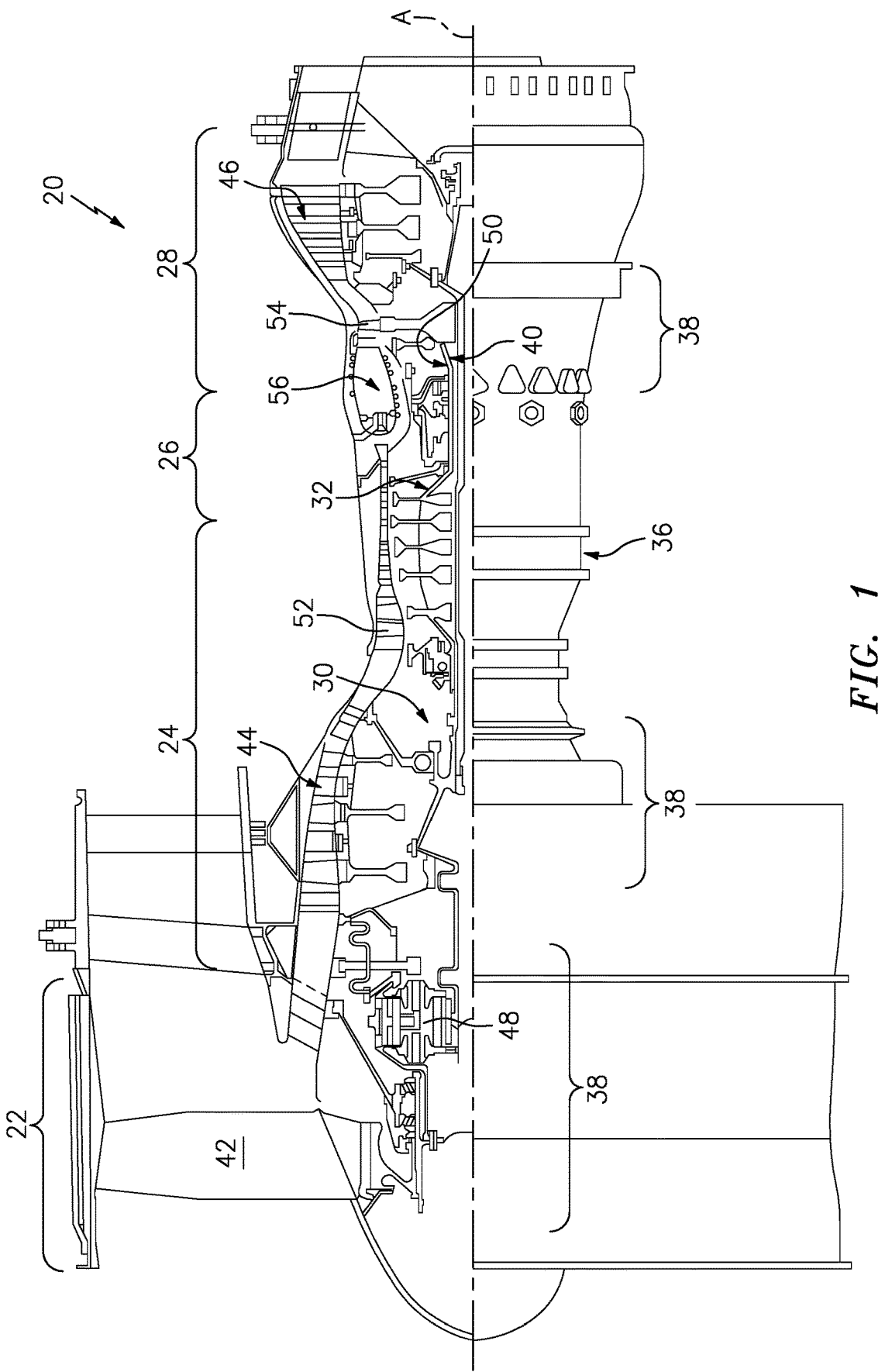
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the engine case structure 36. It should be appreciated that various bearing structures 38 at various locations may alternatively or additionally be provided.

Figure 2:
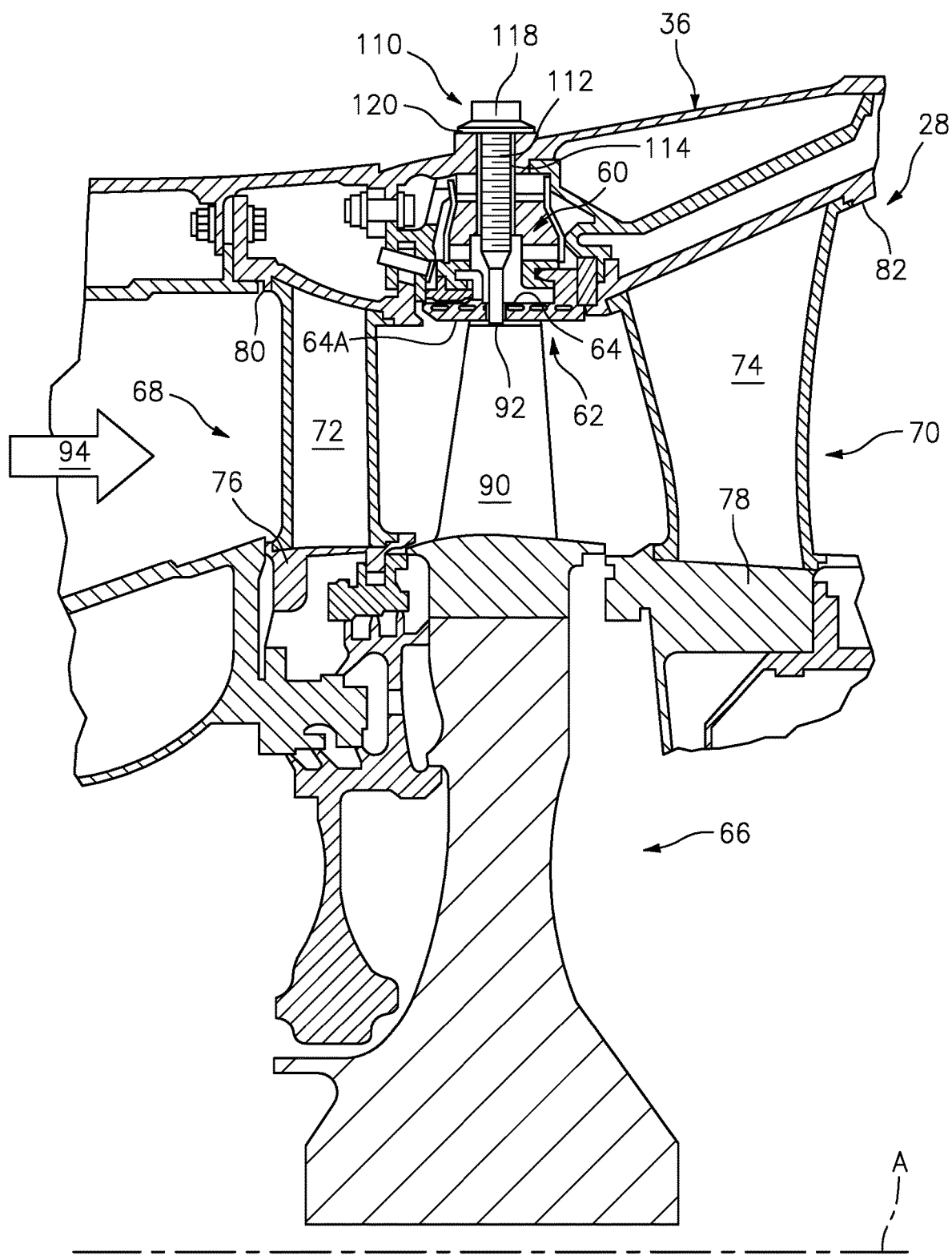
FIG. 2 is an enlarged schematic cross-section of an engine turbine section including a replaceable rotor blade tip clearance measurement device.

With reference to FIG. 2, an enlarged schematic view of a portion of the turbine section 28 is shown by way of example; however, other engine sections will also benefit herefrom. A shroud assembly 60 within the engine case structure 36 supports a blade outer air seal (BOAS) assembly 62 with a multiple of circumferentially distributed BOAS 64 proximate to a rotor assembly 66.

The shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The outer vane platforms 80, 82 are attached to the engine case structure 36. The stator vanes align the flow of the working medium gases while the rotor blades collect the energy of the working medium gases and turn the turbine which in turn drives the compressor.

The blade outer air seal (BOAS) assembly 62 is affixed to the engine case structure 36 adjacent to the blades 90 of the rotor assembly 66. The blade outer air seal (BOAS) assembly 62 bounds the working medium gas flow in a primary flow path 94.

A replaceable rotor blade tip clearance measurement device 110 (also shown in FIG. 3) is mounted through the engine case structure 36 and extends through the blade outer air seal (BOAS) assembly 62 adjacent to a tip 92 of the blades 90. In one embodiment, the replaceable rotor blade tip clearance measurement device 110 is a threaded fastener with a threaded section 112 that engages a threaded bore 114 in the case structure 36. The replaceable rotor blade tip clearance measurement device 110 is thereby readily removable without detailed disassembly of the engine 20.

The replaceable rotor blade tip clearance measurement device 110 further includes an integral abradable tip 116 that interacts with the tip 92 of the blades 90. The integral abradable tip 116 may include a porosity as defined by a percent open area. In one example, the percent open area may be greater than 90%. In this example, the integral abradable tip 116 may protrude from an abradeable surface 64A of the BOAS 64. Adjustment to the protrusion can be performed via on or more custom thickness washers 120 located under a bolt head 118 of the replaceable rotor blade tip clearance measurement device 110. That is, the custom thickness washers 120 may be utilized to position a distal end 122 of the integral abradable tip 116 with respect to the BOAS 64. Whereas the threaded bore 114 provides access to the blade tips 92, a measurement device may be readily inserted therein to provide a base line measurement to blade tips 92.

In certain examples, a plurality of replaceable rotor blade tip clearance measurement devices 110 can be disposed circumferentially about the shroud assembly 60. For instance, a plurality of replaceable rotor blade tip clearance measurement devices 110 can be disposed at a regular angular interval (e.g., an angular interval such that the angle between each of the replaceable rotor blade tip clearance measurement device 110 is substantially constant). In such examples, the tip clearance can be determined at various locations around the shroud assembly 60 corresponding to the location of each of the plurality of replaceable rotor blade tip clearance measurement devices 110. The tip clearance measurements at the plurality of locations can provide information corresponding to a travel path of the rotor blades with respect to shroud assembly 60, such as whether rotor blades rotate symmetrically or asymmetrically about the central axis of shroud assembly 60.

In this embodiment, the replaceable rotor blade tip clearance measurement device 110 may be manufactured via additive manufacturing. The additive manufacturing processes fabricates, or "grow" articles using three-dimensional information such as a three-dimensional computer model. The additive manufacturing process sequentially builds-up layers of materials that include but are not limited to, various titanium alloys including Ti 6-4, Inconel 625 Alloy, Inconel 718 Alloy, Haynes 230 Alloy, stainless steel, tool steel, cobalt chrome, titanium, nickel, aluminum, ceramics, plastics and others in atomized powder material form. In other examples, the starting materials can be non-atomized powders, filled or unfilled resins in liquid, solid or semisolid forms, and wire-based approaches such as wire arc for metals and Fused Deposition Modeling (FDM) for polymers. Alloys such as Inconel 625, Inconel 718 and Haynes 230 may have specific benefit for high temperature environments, such as, for example, environments typically encountered by aerospace and gas turbine engine articles. Examples of the additive manufacturing processes include, but are not limited to, SFF processes, 3-D printing methods, Sanders Modelmaker, Selective Laser Sintering (SLS), 3D systems thermojet, ZCorp 3D printing Binder jetting, Extrude ProMetal 3D printing, stereolithography, Layered Object Manufacturing (LOM), Fused Deposition Modeling (FDDM), Electron Beam Sintering (EBS), Direct Metal Laser Sintering (DMLS), Electron Beam Melting (EBM), Electron Beam Powder Bed Fusion (EB-PBF), Electron Beam Powder Wire (EBW), Laser Engineered Net Shaping (LENS), Laser Net Shape Manufacturing (LNSM), Direct Metal Deposition (DMD), Laser Powder Bed Fusion (L-PBF), Digital Light Synthesis and Continuous Liquid Interface Production. Although particular additive manufacturing processes are recited, any rapid manufacturing method can alternatively or additionally be used. Additive manufacturing facilitates manufacture of a complex integral abradable tip 116.

Figures 3, 4:
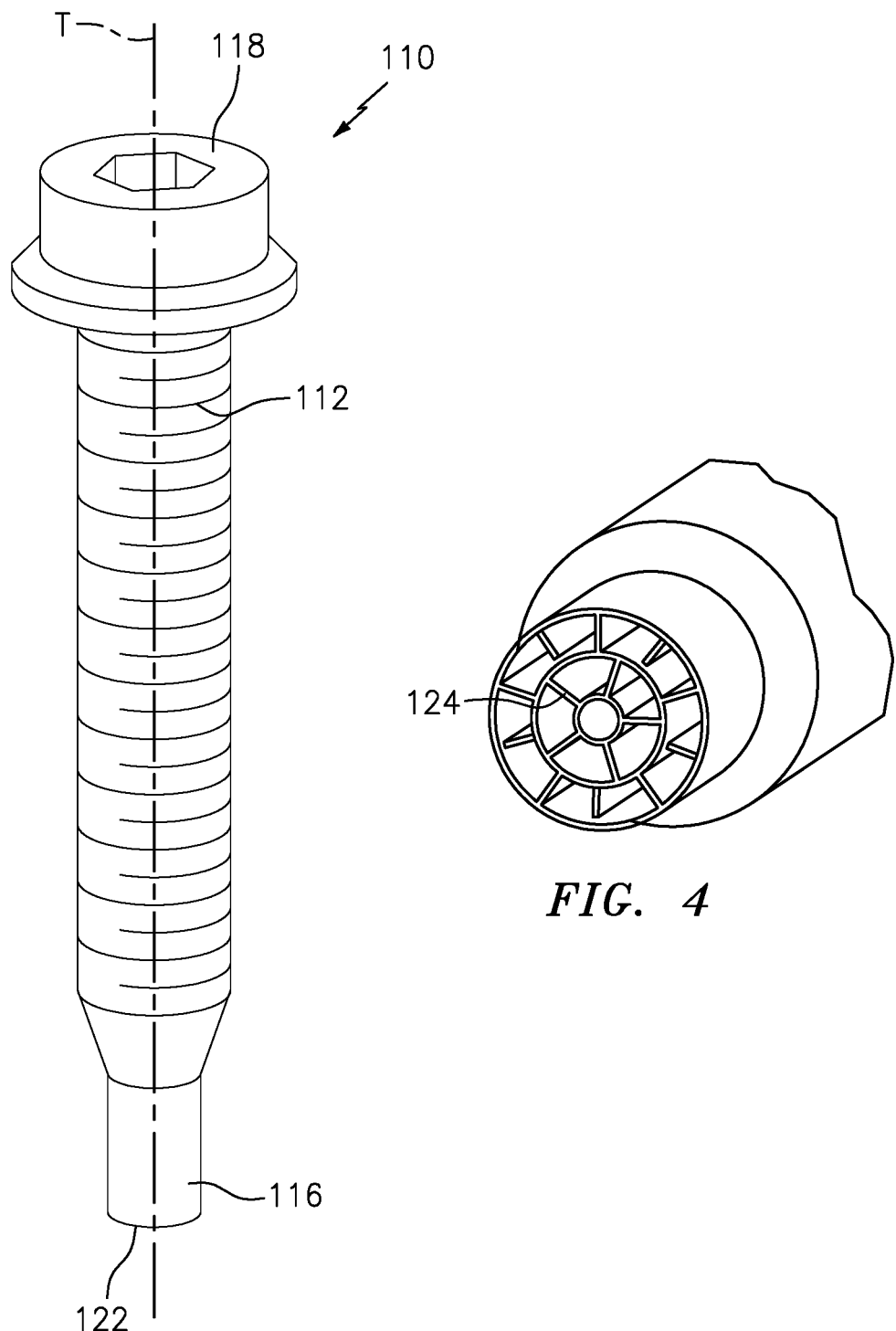
FIG. 3 is a perspective view of a replaceable rotor blade tip clearance measurement device.
FIG. 4 is an integral abradable tip end view of the replaceable rotor blade tip clearance measurement device according to one disclosed non-limiting embodiment.

With reference to FIG. 3, the integral abradable tip 116 may be, in one example, 0.1-1.0 inches (2.5-25.4 mm), and more specifically 0.25 inches (6.35 mm) in diameter and extends for 0.25-1.0 inches (6.35-25.4 mm) and more specifically 0.5 inch (12.7 mm) from the threaded section 112 along an axis T. The integral abradable tip 116 of the replaceable rotor blade tip clearance measurement device 110 includes an internal lattice geometry 124 (FIG. 4) optimized to minimize impact to the blade tip 92 during a rub interaction. The internal lattice geometry 124 may extend for the length of the integral abradable tip 116.

Figure 7:
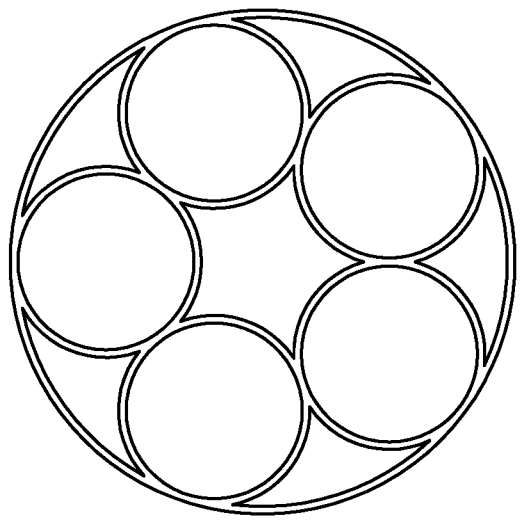
FIG. 7 is an integral abradable tip end view of the replaceable rotor blade tip clearance measurement device according to one disclosed non-limiting embodiment.
Figure 6:
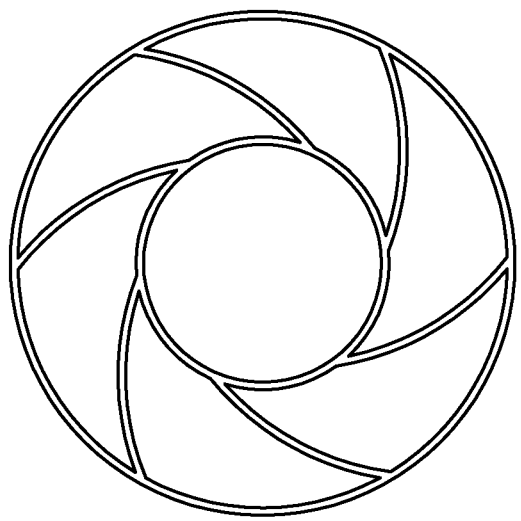
FIG. 6 is an integral abradable tip end view of the replaceable rotor blade tip clearance measurement device according to one disclosed non-limiting embodiment.
Figure 5:
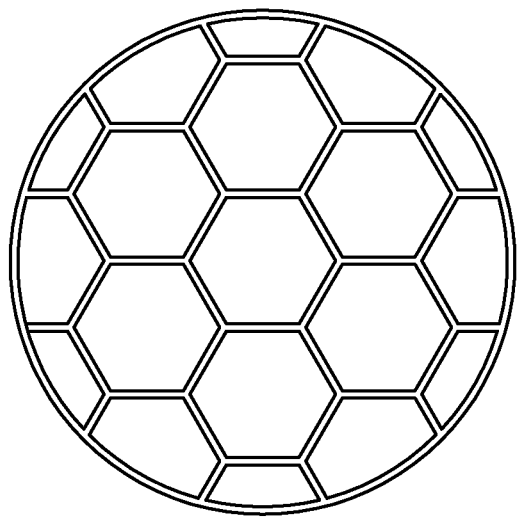
FIG. 5 is an integral abradable tip end view of the replaceable rotor blade tip clearance measurement device according to one disclosed non-limiting embodiment.

The lattice geometry 124 may be readily manufactured via additive manufacturing and may include various patterns such as honeycomb (FIG. 5), spiral (FIG. 6), circular (FIG. 7) and other patterns. The pattern of the lattice geometry 124 may be tailored to control the porosity to be, for example, equivalent to that of the abradeable BOAS 64. That is, the integral abradable tip 116 may be defined to abrade at essentially the same rate as the abradeable BOAS 64. Moreover, the integral abradable tip 116, being additively manufactured, readily resists the shear from the blade tips 92.

During operation, any interaction between the blade tip and the integral abradable tip 116 will result in a rub condition. At desired maintenance intervals, the replaceable rotor blade tip clearance measurement device 110 can be removed and the integral abradable tip 116 inspected for rub measurements based on, for example, a change in length thereof. The integral abradable tip 116 can include a plurality of known dimensions. For instance, the integral abradable tip 116 can be formed such that one or more dimensions, such as a length thereof is a known dimension prior to installation. Accordingly, a tip clearance between one or more of rotor blades and the shroud assembly 60 (and/or coating) can be determined based at least in part on a difference between the initial length of integral abradable tip 116 (e.g., the known length prior to installation) and a length of the integral abradable tip 116 subsequent to rotation of rotor blades during operation of the gas turbine engine. For example, the tip clearance can be determined as the remaining length after engine operation. In some examples, the tip clearance can be determined as the remaining length less a thickness of coating. Removal of the replaceable rotor blade tip clearance measurement device 110 can be performed without major engine disassembly.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A replaceable rotor blade tip clearance measurement device for a gas turbine engine, consisting of:
   a threaded section along an axis, the threaded section having a first end and a second end opposite from the first end along the axis;
   an integral abradable tip with an internal lattice geometry that extends from the first end of the threaded section along the axis; and
   a bolt head at the second end of the threaded section along the axis.

2. The device as recited in claim 1, wherein the integral abradable tip is 0.1-1.0 inches in diameter.

3. The device as recited in claim 1, wherein the integral abradable tip is of a smaller diameter than the threaded section.

4. The device as recited in claim 1, wherein the internal lattice geometry is of a honeycomb pattern.

5. The device as recited in claim 1, wherein the internal lattice geometry is of a spiral pattern.

6. The device as recited in claim 1, wherein the internal lattice geometry is of a multiple circle pattern.

7. The device as recited in claim 1, wherein the internal lattice geometry is abradeable equivalent to an abradeable surface of a blade outer air seal.

8. The device as recited in claim 1, wherein the internal lattice geometry is additively manufactured.

9. A gas turbine engine, comprising:
   an engine case; and
   a replaceable rotor blade tip clearance measurement device accessible from outside the engine case, the replaceable rotor blade tip clearance measurement device consisting of:
   a threaded section along an axis;
   an integral abradable tip with an internal lattice geometry that extends from the threaded section along the axis; and a bolt head at an opposite end of the threaded section from the integral abradable tip, wherein the integral abradable tip has an internal lattice geometry that defines a percent open area greater than 90%.

10. The gas turbine engine as recited in claim 9, wherein the threaded section, the bolt head and the integral abradable tip are aligned along the axis.

11. The gas turbine engine as recited in claim 10, wherein the integral abradable tip is of a smaller diameter than the threaded section.

12. The gas turbine engine as recited in claim 11, wherein the internal lattice geometry is one of a honeycomb pattern, a spiral pattern, and a multiple circle pattern.

13. The gas turbine engine as recited in claim 11, wherein the internal lattice geometry is shaped to define a predefined porosity with respect to a blade.

14. The gas turbine engine as recited in claim 11, wherein the replaceable rotor blade tip clearance measurement device is additively manufactured.

15. The gas turbine engine as recited in claim 11, further comprising a multiple of replaceable rotor blade tip clearance measurement devices disposed circumferentially about the engine case.

16. The gas turbine engine as recited in claim 11, wherein the internal lattice geometry is additively manufactured.

17. The gas turbine engine as recited in claim 9, wherein the integral abradable tip extends through a blade outer air seal.

18. The gas turbine engine as recited in claim 17, wherein the integral abradable tip abrades equivalent to the blade outer air seal.

19. The gas turbine engine as recited in claim 9, further comprising a blade outer air seal and rotor blades rotatably positioned within the blade outer air seal, the blade outer air seal and integral abradable tip being abradable by the rotor blades, wherein abrasion to the integral abradable tip is representative of abrasion to the blade outer air seal.

20. The gas turbine engine as recited in claim 9, wherein the replaceable rotor blade tip clearance measurement device extends through the engine case.

* * * * *